United States Patent [19]

Walker

[11] Patent Number: 4,637,944

[45] Date of Patent: Jan. 20, 1987

[54] PROCESS AND DEVICE FOR TEMPORARILY HOLDING AND RELEASING OBJECTS

[75] Inventor: George E. Walker, Longmeadow, Mass.

[73] Assignee: Monsanto Company, St. Louis, Mo.

[21] Appl. No.: 713,477

[22] Filed: Mar. 19, 1985

[51] Int. Cl.$^4$ ............................................. B29C 61/00
[52] U.S. Cl. ...................................... 428/35; 428/131; 428/913; 264/230; 264/342 R; 264/345
[58] Field of Search .................... 428/913, 36, 131, 35; 264/230, 342 R, 344, 345, DIG. 7; 248/316, 316.3; 174/DIG. 8

[56] References Cited

U.S. PATENT DOCUMENTS

| | | | |
|---|---|---|---|
| 4,035,534 | 7/1977 | Nyberg | 428/36 |
| 4,087,849 | 5/1978 | Colville et al. | 431/359 |
| 4,442,153 | 4/1984 | Meltsch | 428/36 |

Primary Examiner—John E. Kittle
Assistant Examiner—James J. Seidleck
Attorney, Agent, or Firm—Fishman & Dionne

[57] ABSTRACT

A process and device utilizing the memory characteristics of cross-linked polymers for temporarily holding and releasing parts or components is presented. In a first step, a polymeric material or part capable of being cross-linked is formed into a first "memory" shape. Thereafter, in a next step, the polymer is cross-linked via irradiation or any other suitable technique to fix or lock the polymer into the first memory shape. Next, the polymer is heated and deformed to a second shape and thereafter cooled to lock in that second shape. During the deformation process, the cross-linked polymer will preferably be deformed about a second component or part so that upon cooling, the second part will be tightly held by the deformed polymer. Thus, the second part or component will be temporarily held for any desired length of time. When it is desired to release the second part, the deformed cross-linked polymer part is subjected to a second heating (above its transition temperature) whereupon the polymer will revert back to its first memory shape and thereby release the second part or component held therein. In an alternative embodiment of the present invention, the cross-linked deformed polymeric material may be itself held; the deformed cross-linked material releasing itself from the holder upon reheating (above its transition temperature).

33 Claims, 63 Drawing Figures

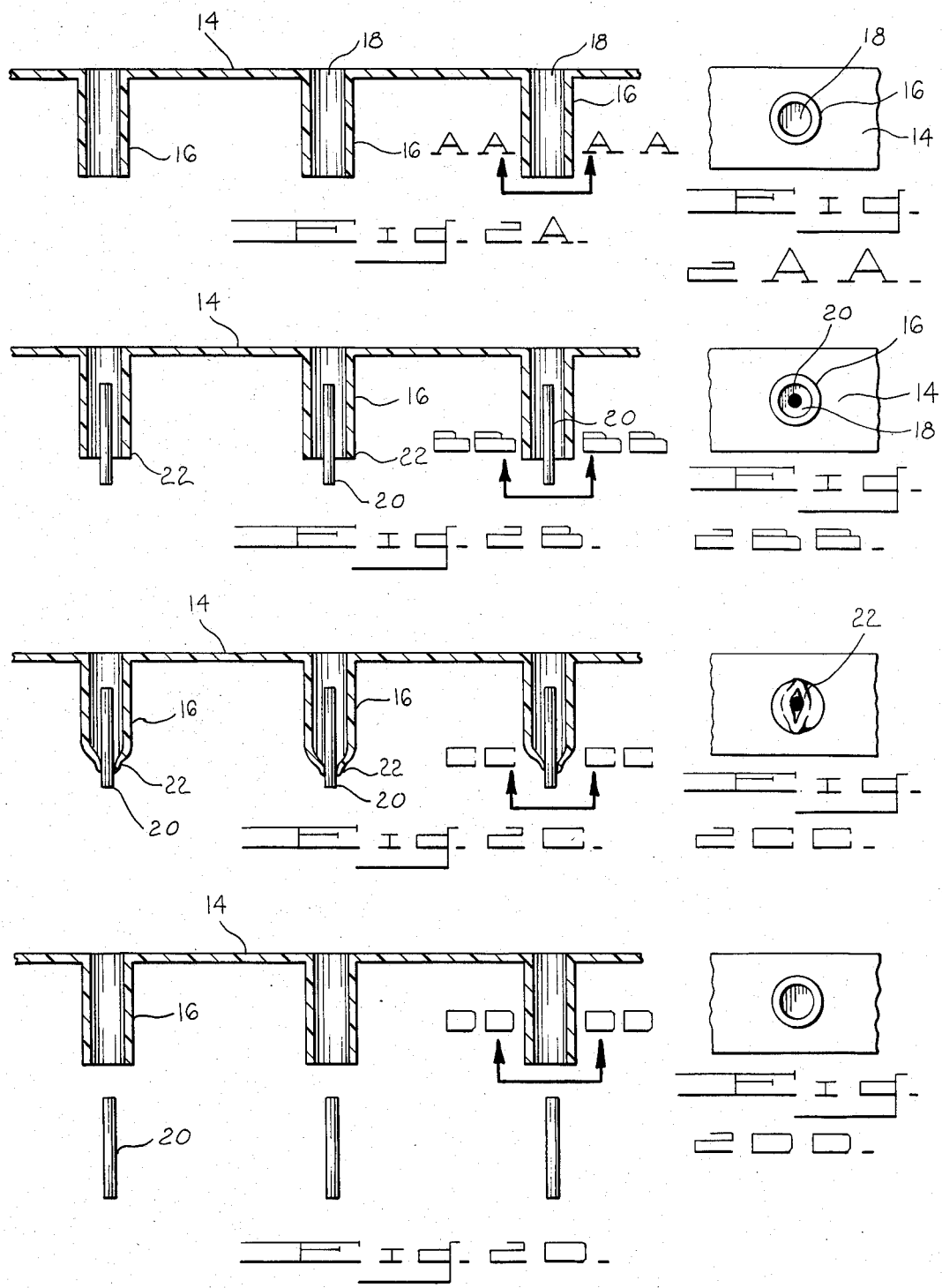

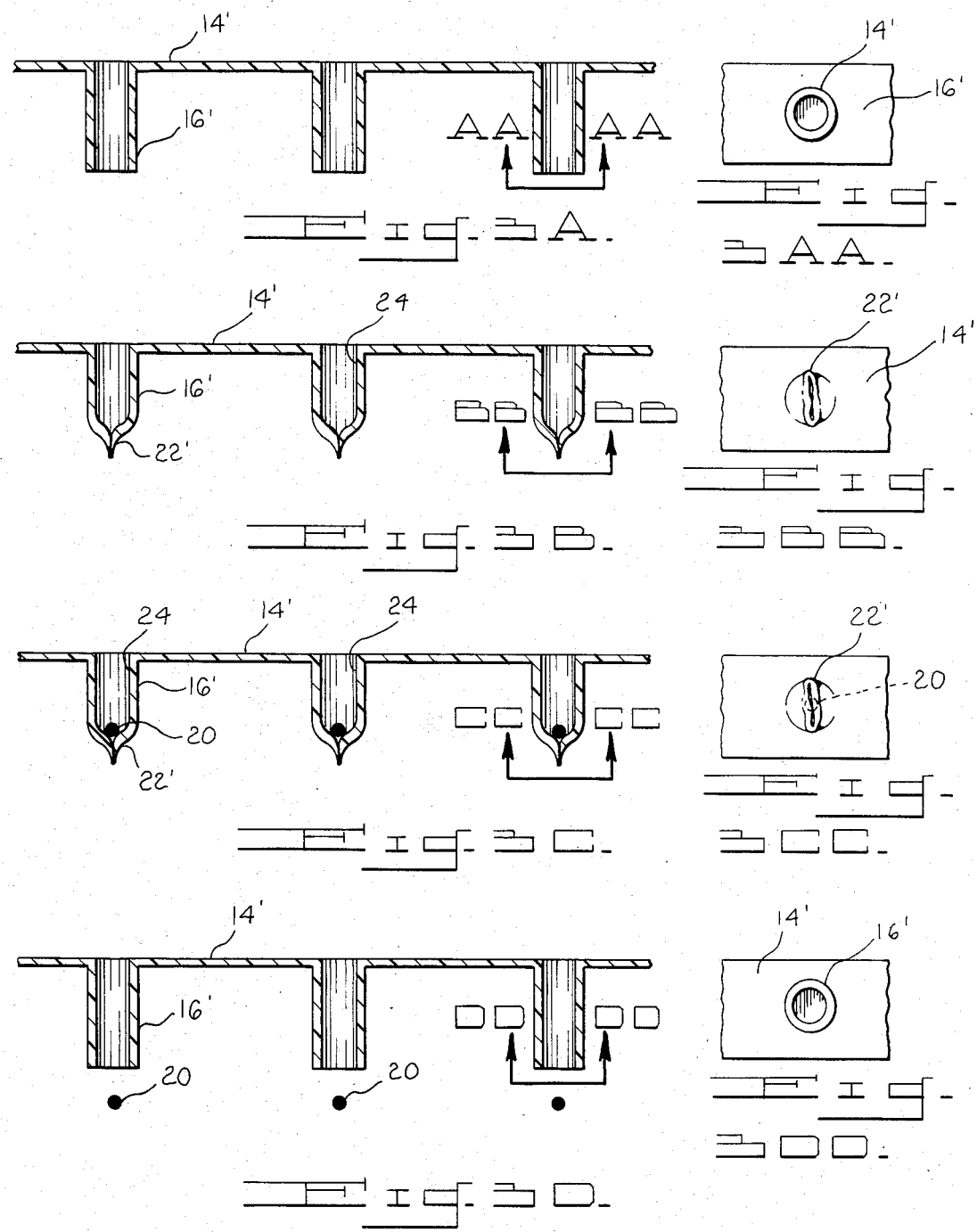

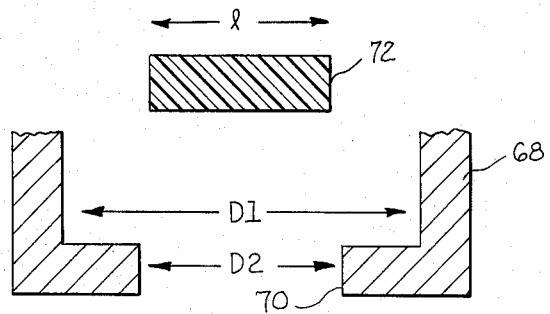
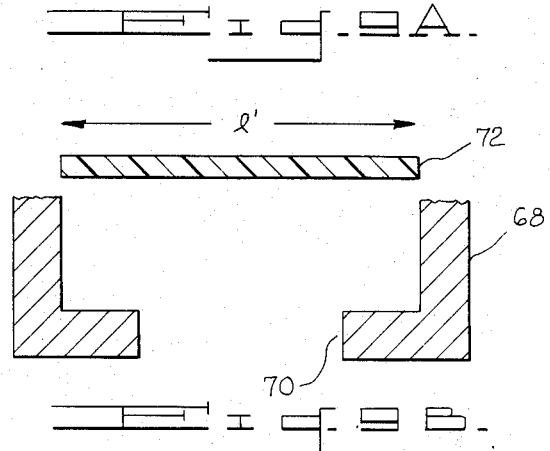
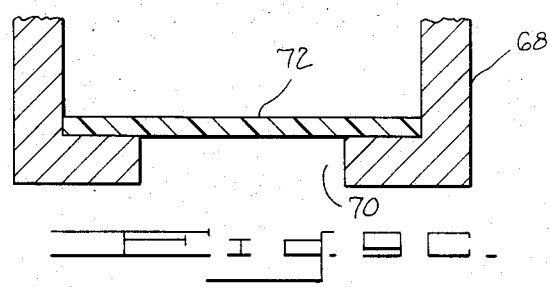
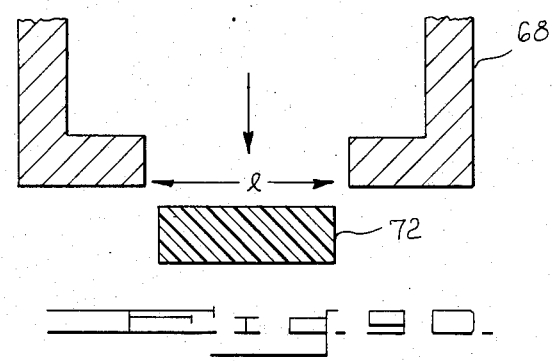

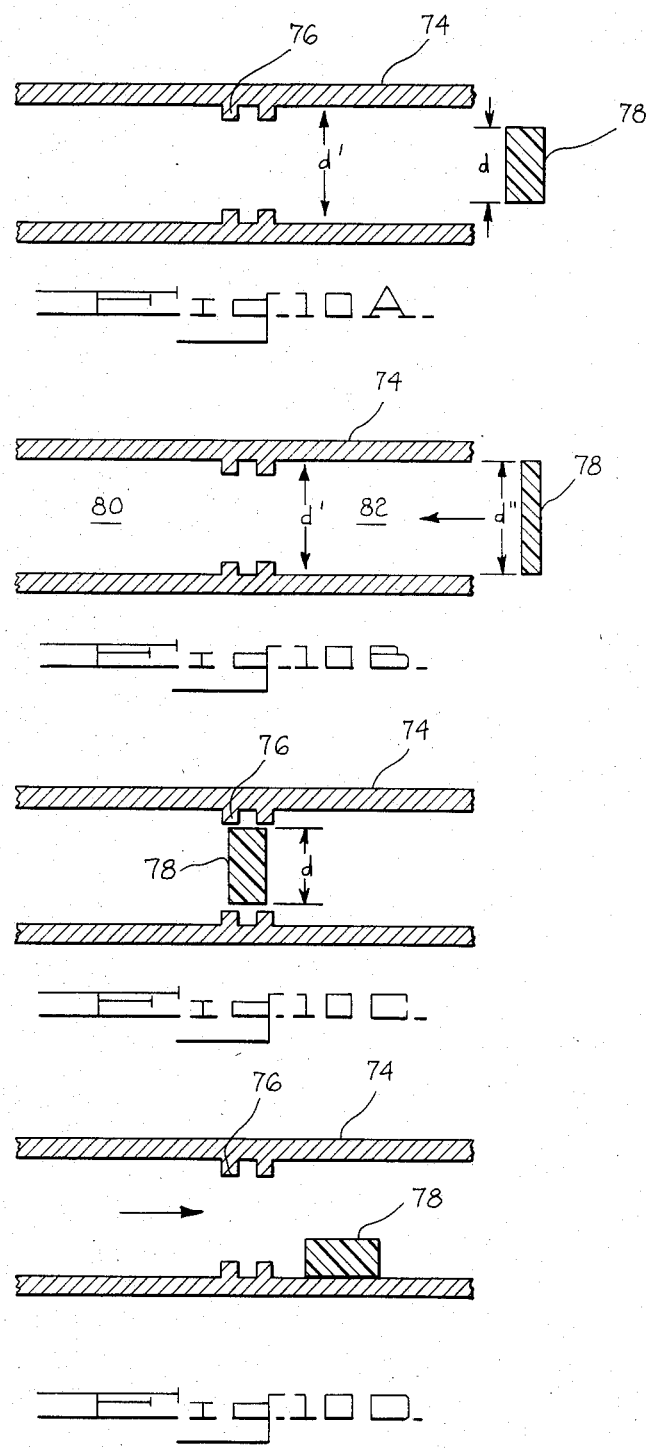

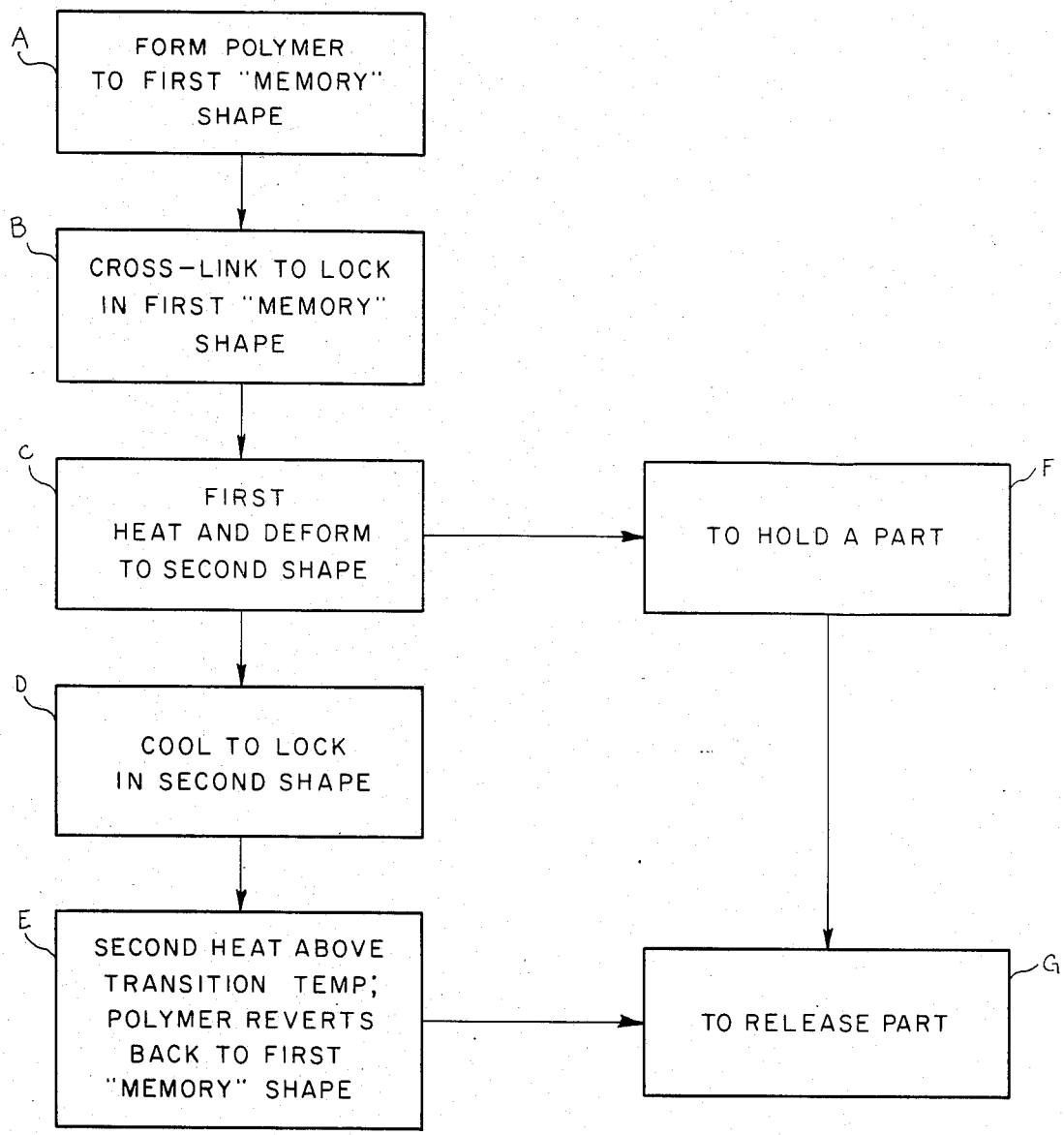

PROCESS AND DEVICE FOR TEMPORARILY HOLDING AND RELEASING OBJECTS

BACKGROUND OF THE INVENTION

This invention relates to several useful applications of cross-linked polymers utilizing the inherent memory phenomenon associated with such cross-linked polymeric materials to effect a temporary attachment of a first part to a second part. More particularly, this invention relates to a device and method of using cross-linked polymeric materials wherein a polymer is formed to a first "memory" shape; thereafter the shaped polymer being cross-linked to lock in that first "memory" shape. Next, the shaped polymer is heated and deformed to a second shape; and then cooled to lock in that second shape, the deformed shape effecting attachment or holding to another part. This is followed by a second heating above the polymeric transition temperature which will act to release the held part as the deformed cross-linked polymer reverts back to its first "memory" shape.

The memory characteristics of cross-linked polymeric materials is well known to those skilled in the art. This novel property of cross-linked polymers has been practically utilized in several prior art applications. For example, shrink tubing and the like is one such well known application. In shrink tubing, the cross-linked polymer is expanded and upon heating, reverts back to its original smaller shape. Other examples include U.S. Pat. No. 3,382,121 to Sherlock which discloses a process for preparing a heat recoverable sleeve with a fusible insert held in contact therewith. An extruded or formed longitudinally oriented plastic insert is placed adjacent to a recoverable plastic member and the assembly is thereafter heated to a temperature sufficient to release the stresses in the insert induced by orientation; and to cause the insert to retract in length, and tightly cling to, the recoverable member. In the assembly thus produced, the insert is brought into abutting relationship to the recoverable member.

U.S. Pat. No. 4,343,844 to Thayer et al discloses a shrinkable sleeve of minimal outside diameter made from heat shrinkable material having an elastic memory and adapted to be secured to the end of an electrical cable having one or more electrical conductors and/or tubes extending therefrom to provide a barrier to the flow of gas or vapors therethrough. When the sleeve is in an expanded state, a cavity at one end receives the conductor bundle. The sleeve contains one or more internal channels at the opposite end thereof that are separated from each other by walls that are related to the wall of the remainder of the sleeve.

In U.S. Pat. No. 3,597,372 to Cook, a method is disclosed for making elastomeric products which have the properties of elastic deformation substantially equal to that of true elastomers, and, upon the application of heat, recover to the original cross-linked size. A composition is formed which is then cross-linked by ionizing radiation. The cross-linked article is then heated to a temperature sufficiently high to soften the thermoplastic component. The deformed article is cooled or quenched while still under the external deforming stress. The article is now in the heat-recoverable state, but may be left for an indefinite period of time at room temperature without danger of its recovering back to its original size and shape.

Evans U.S. Pat. No. 3,847,721 discloses an article processed to be heat recoverable in involute fashion to an overlapping, generally cylindrical configuration. The articles are initially heat recoverable to a cross-section "S". The article can be deployed around a substrate to be protected, the arcuate edge portions thereof positioned in interlocking relation, and heat applied to the interlocked edge portion to form a bonded seam.

Finally, U.S. Pat. No. 4,440,712 to Imgram discloses a process for the preparation of shaped articles, particularly tubular shaped polymeric articles, comprising moldable and cross-linkable synthetic plastic material, into a first molded shape, cross-linking the plastic material at a temperature in excess of the crystalline melting point of material, subjecting the cross-linked first shape to a working operation to form a second configuration shape; and subjecting specific areas of the second shape to a heat treatment thereby forming a deformation in the specific area. Other prior art patents of general interest which utilize the memory characteristics of cross-linkable polymeric materials include U.S. Pat. Nos. 2,981,668, 2,086,242, 3,110,553, 3,318,994, 3,370,112, 3,387,065, 3,396,460, 3,420,363, 3,526,863, 3,959,052, and 4,033,534.

It will be appreciated that none of the above described and discussed prior art patents disclose a method of utilizing the inherent "memory" characteristic of cross-linkable polymers for those applications wherein a temporary attachment of a first part to a second part is effected. Such temporary holding of cooperating parts is necessitated in a myriad of industrial, agricultural, construction and safety applications to name but a few. For example, in automatic assembly operations, component parts must be temporarily held and oriented so as to be provided to an assembly at a specific time and place. Similarly, in the construction field, fasteners, terminals, rivets and other items must be temporarily held in a substrate or bin when being used in automatic insertion devices. Fire safety and similar safety applications require parts and assemblies which will be automatically removed to expose sprinkler systems or other devices during fires.

Accordingly, it is an object of the present invention to provide a device and method of using a cross-linkable polymeric material which utilizes the inherent "memory" characteristic thereof to effect temporary holding or attachment between several parts or components in a variety of industrial, agricultural, construction, safety and other applications.

It is still another object of the present invention to provide a process and device for utilizing the "memory" characteristic of cross-linked polymers wherein a polymer "part" is formed to a first shape and cross-linked to hold that first "memory shape"; the cross-linked polymer part being thereafter heated and deformed to temporarily lock on to and hold a second "part", and the polymer part being cooled to lock the second shape therein. Thereafter, when desired, the deformed polymer part is heated above its transition temperature wherein it will revert back to its first memory shape and the held or secured second part will be released. The process of the present invention will thus take advantage of the memory characteristic of cross-linked polymers by holding and thereafter releasing components at specified times and places.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures;

FIGS. 2A-2D are cross-sectional elevation views of a process utilizing cross-linked polymeric materials wherein a component or part is temporarily held and thereafter released in accordance with the present invention;

FIGS. 2AA-2DD are elevation views along the lines AA—AA, BB—BB, CC—CC, and DD—DD of FIGS. 2A-2D, respectively.

FIG. 3A-3D are cross-sectional elevation views, similar to FIGS. 2A-2D, and showing the holding and releasing process for round objects in accordance with the present invention;

FIGS. 3AA-3DD are elevation views along the lines AA—AA, BB—BB, CC—CC and DD—DD of FIGS. 3A-3D, respectively.

FIGS. 4AA-4CC are cross-sectional elevation views showing the holding and releasing process of FIGS. 4A-4C, respectively.

FIGS. 5AA-5DD are enlarged perspective views of a portion of the holding and releasing process shown in FIGS. 5A-5D, respectively.

FIGS. 9A-9D are cross-sectional elevation views showing still another embodiment of the holding and releasing of a panel in accordance with the present invention;

FIGS. 10A-10D are cross-sectional elevation views showing yet another embodiment for holding and releasing panels in accordance with the present invention;

FIG. 13 is a flow diagram of the process in accordance with the present invention.

DESCRIPTION OF THE PREFERRED EMBODIMENT

Figure 1A:
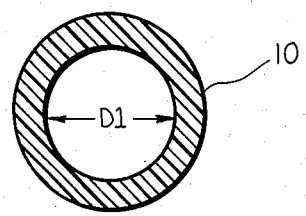
FIGS. 1A-1D are cross-sectional elevation views disclosing the memory effect of cross-linked polymers in existing shrink tubing in accordance with the prior art.
Figure 1B:
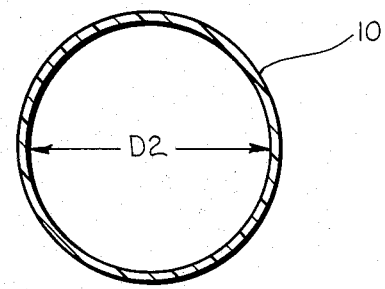
Figure 1C:
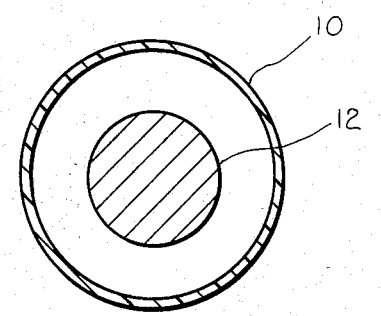
Figure 1D:
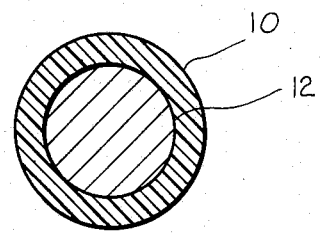

The present invention is directed to a novel method of, and device for, temporarily holding or engaging and thereafter releasing a plurality of parts or components. This process and device may be utilized in a very large number of applications including, but not limited to the fields of industry, agriculture, consumer goods, safety equipment and construction. The method of holding and releasing in accordance with the process of the present invention is characterized by a novel use of the well known memory properties of cross-linkable polymeric materials. As discussed hereinabove, the memory characteristic of cross-linked polymers is well known and has been adapted in several known applications; most noticeably in the heat shrink field. An example of the prior art application of the memory effect of cross-linked polymers is described in FIGS. 1A-1D. Thus, in FIG. 1A, a cross-linked polymeric tubing is shown generally at 10 having a diameter of D1. The D1 diameter of tubing 10 may be defined as its memory shape. In FIG. 1B, cross-linked polymeric tubing 10 has been heated and deformed to a second shape and a second diameter D2; and thereafter cooled to lock that second shape. Next, a second part, such as a wire conductor 12, having a diameter equal to or greater than D1 is inserted into tubing 10 as shown in FIG. 1C. Finally, upon a second heating, polymeric tube 10 will shrink and recover back to its original diameter D1 thus forming a snug fit about the inserted wire conductor 12 as shown in FIG. 1D.

While the heat shrink tubing of FIG. 1 and similar applications of the prior art have found great utility in many practical applications, other methods of practically and efficiently utilizing the memory characteristics of cross-linked polymers are needed. The present invention overcomes this deficiency by the method and device disclosed herein wherein the memory characteristics of cross-linked polymers is used to temporarily hold or engage and then release parts or components. Turning now to FIG. 13, a flow diagram in accordance with several preferred embodiments of the present invention is shown. In a first step A, a polymeric material or part capable of being cross-linked is formed into a first "memory" shape. Thereafter, in step B, the polymer is cross-linked via irradiation or any other suitable technique (i.e., chemical additives) to fix or lock the polymer into the first memory shape. Next, the polymer is heated and deformed to a second shape (step C) and thereafter cooled to lock in that second shape (step D). During the deformation process, the cross-linked polymer will preferably be deformed about a second component or part so that upon cooling (step D), the second part will be tightly held or engaged by the deformed polymer (step F). Thus, the second part or component will be temporarily held for any desired length of time. When it is desired to release the second part, the deformed cross-linked polymer part is subjected to a second heating (above its transition temperature) whereupon the polymer will revert back to its first memory shape (step B) and thereby release the second part or component held therein (step G). Accordingly, heating the deformed polymeric material above its transition temperature will return it to its original memorized shape. This process of temporarily holding and then releasing parts and the device to practice the process is well suited for many practical applications as will be discussed in greater detail below.

It will be appreciated that any polymer which can be cross-linked by high intensity ionizing radiation (electron beam, cobalt 60, etc.) may be used in accordance with the process of the present invention. Suitable cross-linkable polymers include, but are not limited to polyethylene, polyethylene co-polymers such as ethylenevinylacetate (EVA), polyvinylchloride (PVC), cross-linkable elastomers, blends of PVC and elastomeric materials and cross-linked EVA/wax blends.

The novel process as described above in connection with the flow diagram in FIG. 13 is further exemplified by the numerous examples disclosed in FIGS. 1–12. Turning now to a discussion of the several examples, in FIGS. 2A and 2AA, a cross-linked polymeric strip or base 14 having a plurality of cylinders 16 extending outwardly therefrom, each cylinder having an opening 18 therethrough, is shown. Strip 14 and cylinders 18 have been formed from a cross-linkable polymer and have been subjected to radiation to effect cross-linking; and to lock in the memory shape as is shown in the Figures. Thereafter, metal cylindrical rods 20 are placed into openings 18 (FIGS. 2B and 2BB) and the cylinders 16 are then heated and deformed at a first end 22 thereof to effect a snug hold on the rods 18 as shown in FIGS. 2C and 2CC. Cylinders 16 are then cooled to lock in the deformed shape and thereby temporarily hold the rods in strip 14 for any desired length of time. When desired, cylinders 16 are then heated a second time above the transition temperature of the cross-linked polymer whereupon the deformed ends 22 of cylinders 16 will revert back to the first memory shape shown in FIG. 2A and thereby release the rods 18 as is clearly shown in FIGS. 2D and 2DD.

It will be appreciated that while cylindrical rods 18 have been shown in FIG. 2, any part or component used in a given assembly operation may be used in conjunction with the particular embodiment of the present invention shown herein. For example, in FIGS. 3A–3D and 3AA–3DD, a round object 20 is used in a strip 14' in a process similar to that shown in FIG. 2. Thus, in FIGS. 3A–3C, cylinders 16' are formed and cross-linked to a first memory shape and thereafter are heated, deformed and cooled to a second shape (FIGS. 3B and 3BB); this second shape acting to close off or seal the first end 22' of cylinders 16'. Next, a round object 20 is inserted from the end 24 opposite the sealed end 22' whereupon the deformed sealed end 22' will hold round object 20 for any desired length of time. Finally, deformed and sealed end 22' is subjected to a second heating whereupon the deformed polymer will revert back to its original first memory shape and the round objects 20 will be released (FIG. 3D).

A cross-linked strip having a plurality of holding members extending therefrom such as strip 14 in FIGS. 2 and 3 offers a favorable alternative to many industrial and other applications which necessitate the automatic feeding or assembly of components or parts at selected times and places. For example, presently, many assembly operations of small parts utilize large bin feeders for feeding the parts such as those shown in FIGS. 2 and 3. However, such bin feeders do not function adequately for complex shapes and deformable parts i.e., springs. The method of the present invention for temporarily holding and releasing objects (upon heating) utilizing a cross-linked polymer structure such as shown in FIGS. 2 and 3 would alleviate such problems.

Figure 4A:
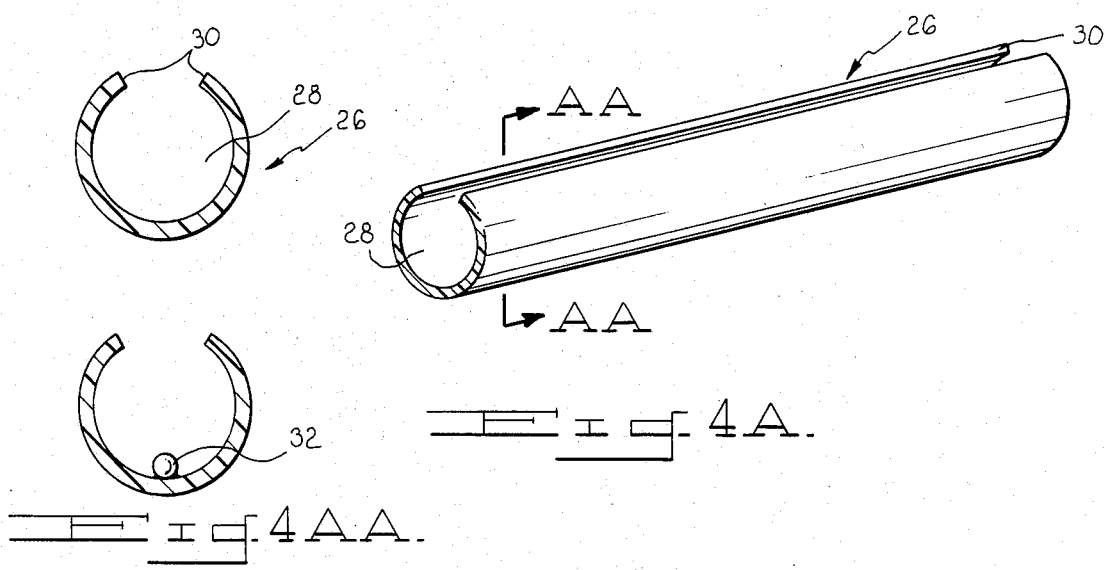
FIGS. 4A-4C are perspective views, partly in cross-section, showing the holding and releasing process for a plurality of round objects in accordance with the present invention.
Figure 4B:
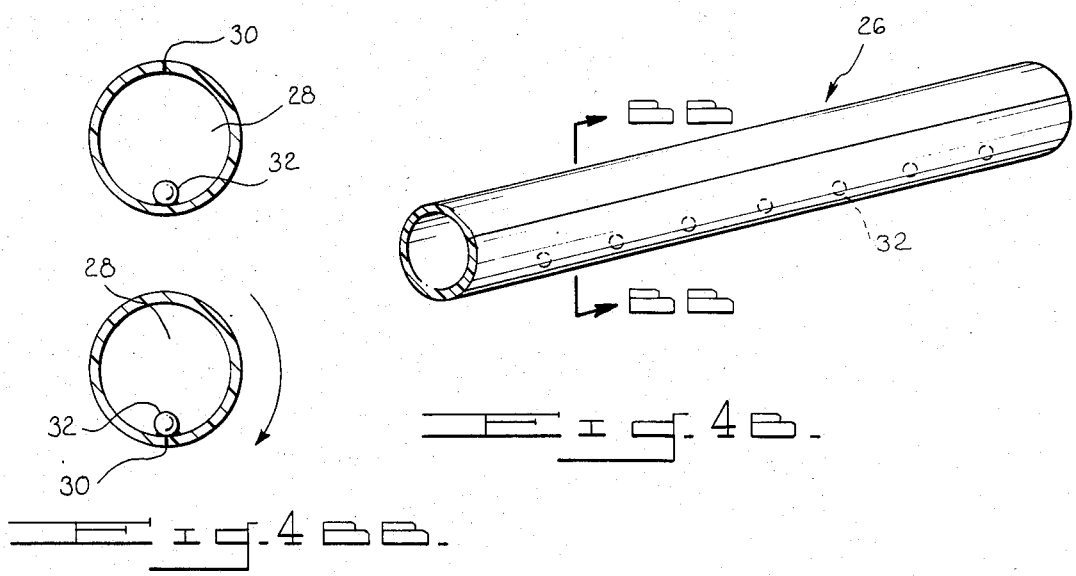
Figure 4C:
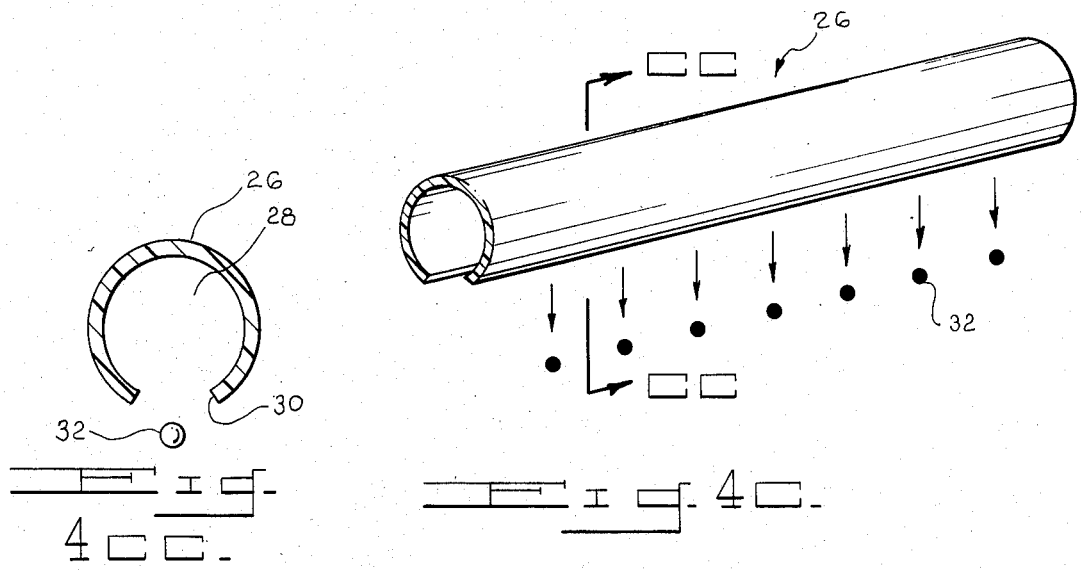

Turning now to FIGS. 4A–4C and 4AA–4CC, another method of practicing the process of the present invention is shown. In FIGS. 4A and 4AA, a section of a cross-linkable polymeric cylindrical tube 26 is shown. Tube 26 has an opening 28 therethrough and a longitudinal slot 30 which provides access from the inner opening 28 to the outside. The tubular configuration as shown in FIG. 4A is then subjected to irradiation whereupon the polymer will lock into a first memory shape. Next, objects or parts such as round items 32 are provided within the interior 28 of tube 26 via slot 30. Thereafter, tube 26 is subjected to heating, deformation and cooling to effect closure of slot 30 so that the round items 32 may not escape (FIGS. 4B and 4BB). The tube is then rotated 180° as indicated by the arrow in FIG. 4BB so that slot 30 is now aligned with round object 32. At a desired time, tube 26 is subjected to a second heating (above the transition temperature of the polymer) so that tube 26 will revert back to its original memory shape whereupon slot 30 will once again open and permit release of the round items 32. While suitable for many purposes, the cylindrical tube 26 shown in FIG. 4 is particularly suitable for use as a seed dispenser in agricultural applications or in any other application wherein the time release of a plurality of objects is needed. In such an agricultural application, the seeds (i.e., analogous to round objects 32) may be released after being subjected to the heat of the sun during planting season.

Figures 5A, 5B, 5C, 5D:
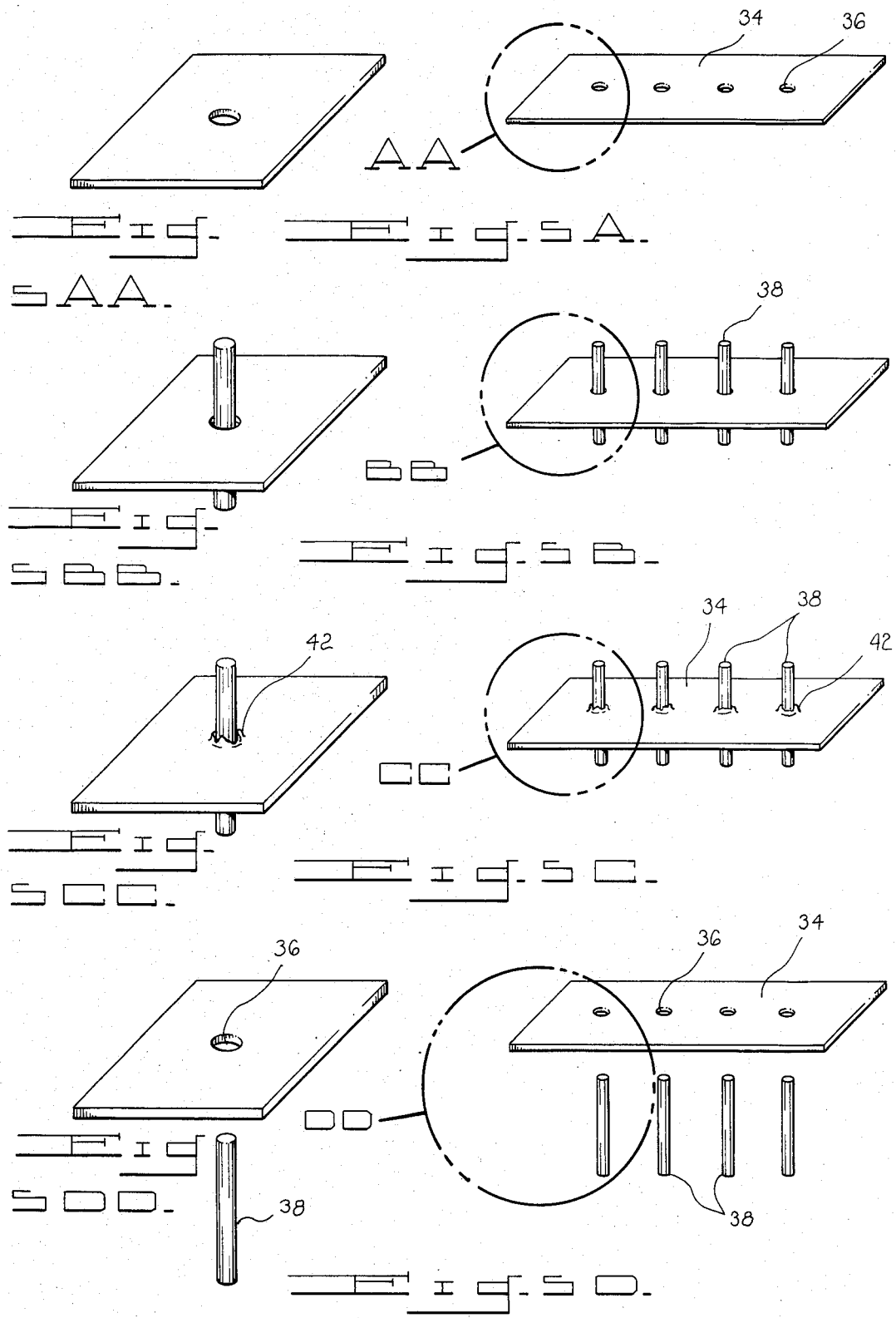
FIGS. 5A-5D are perspective views showing the holding and releasing process for a plurality of cylindrical objects in accordance with the present invention.

In FIGS. 5A–5D, yet another embodiment of the process of the present invention is shown. In FIGS. 5A and 5AA, a planar strip or sheet 34 having a plurality of openings 36 therethrough, and longitudinally spaced through the center thereof, is shown. Strip 34 is comprised of a cross-linkable polymeric material and is locked into the configuration shown in FIGS. 5A and 5AA via irradiation to form a first memory shape. Thereafter, cylindrical objects 38 which may preferably consist of nails, fasteners, terminals, rivets or other similar components are provided through openings 36 (FIGS. 5B and 5BB). Upon heating, deformation and subsequent cooling, cylindrical objects 38 are held tightly to strip 34 via the deformed area 40 about each of the cylindrical objects 38 (FIGS. 5C and 5CC). Finally, at any desired time, the deformed strip 34 is heated a second time (above its transition temperature) whereupon the strip 34, particularly deformed areas 40, will revert back to the initial memory shape (FIG. 5A) so as to release the several cylindrical objects 40 as shown in FIGS. 5D and 5DD. It will be appreciated that the embodiment of the present invention as shown in FIGS. 5A–5D is particularly useful in assembly processes utilizing automatic inserting tools for automatically dispensing heat actuated fasteners and similar components.

Figures 6A, 6B:
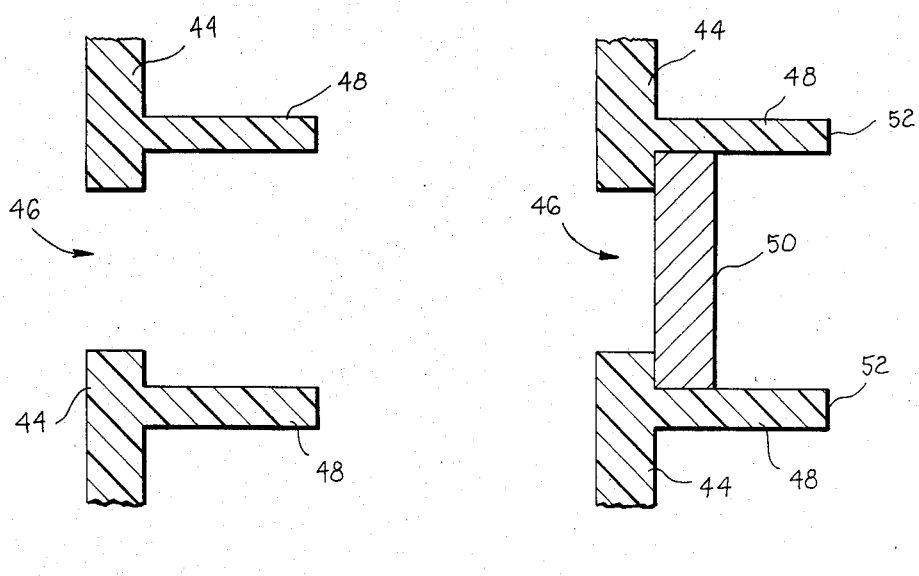
FIGS. 6A-6D are cross-sectional elevation views showing the holding and releasing of a panel in accordance with the present invention.
Figures 6C, 6D:
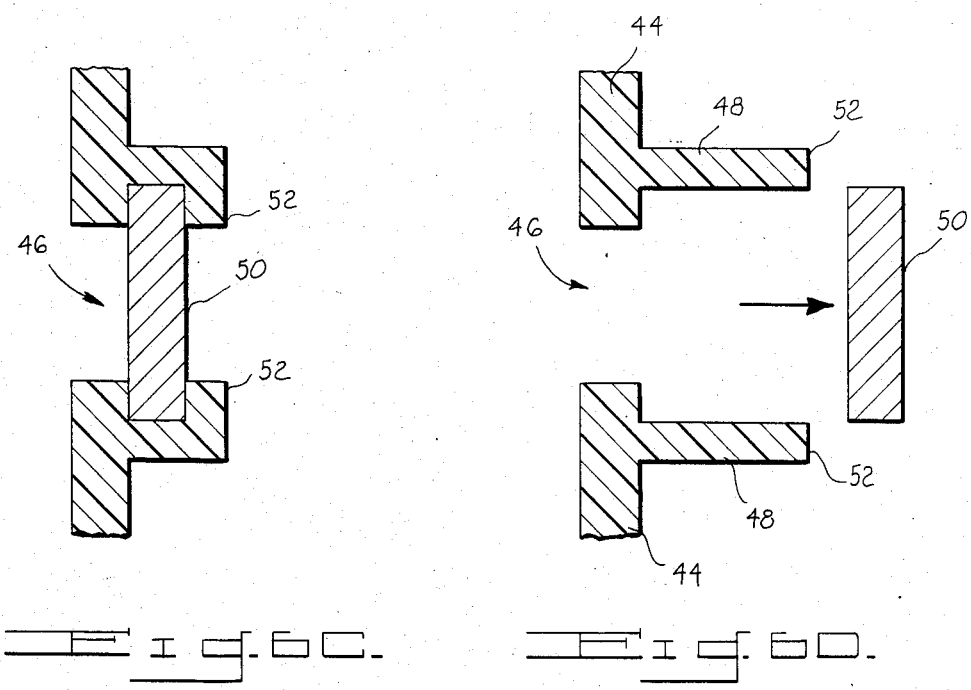

In FIGS. 6A–6D, the cross-linkable polymeric material is initially formed in its memory shape as an open flange and comprises side wall 44 having an opening 46 therebetween; and a pair or perpendicular extension walls 48 (which may alternatively be comprised of a cylinder). This configuration is then subjected to irradiation or other means to effect cross-linking of the polymer and attain a first memory shape. Next, a disc or other suitably shaped object 50 is fit between extended walls 48 to effect closure of opening 46 (FIG. 6B). The cross-linked polymer is then heated above its transition temperature whereupon the two end portions 52 of side extensions 48 are deformed and then cooled so as to lock and hold disc 50 in opening 46 (FIG. 6C). Thereafter, at any desired time, the deformed cross-linked polymer may be heated above its transition temperature so that the end portions 52 revert back to their original linear shape i.e. memory shape, and the disc 50 is then released as shown in FIG. 6D. The embodiment of the present invention shown in FIGS. 6A–6D is particularly well suited for those applications requiring high temperature (i.e., heat triggered) releasing or blowouts. For example, the embodiment of FIG. 6 may be useful as a safety valve in chemical operations or as a means of releasing fire extinguishing fluid in a fire fighting system.

Figure 7A:
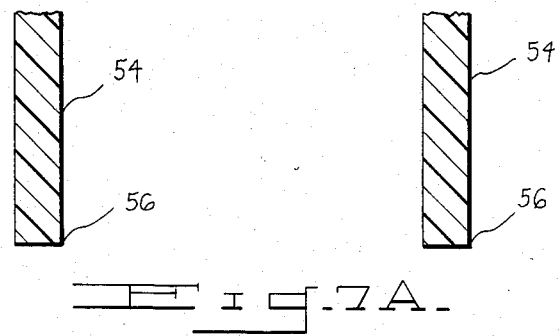
FIGS. 7A-7D are cross-sectional elevation views of another alternative method of holding and releasing a panel in accordance with the present invention.
Figure 7B:
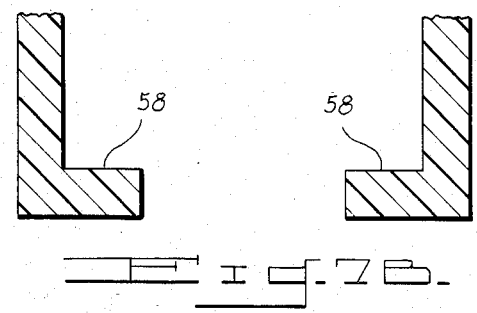
Figure 7C:
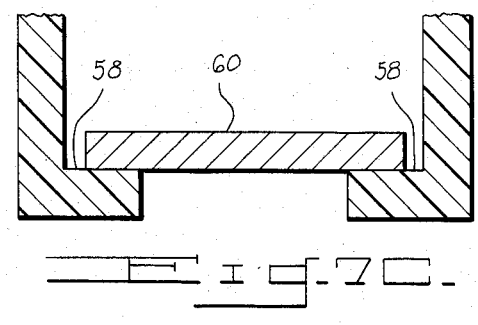
Figure 7D:
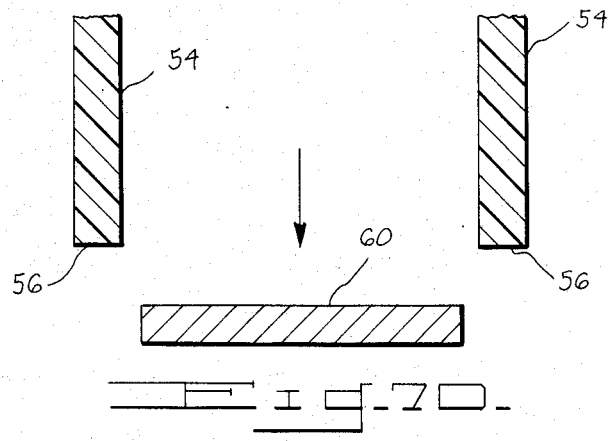

A similar application for the temporary holding and subsequent releasing of objects by a deformed, cross-linked polymeric material is shown in FIGS. 7A-7D. In FIG. 7A, a cross-sectional portion of a cylinder is shown generally at 54. This configuration is formed by a cross-linkable polymeric material which is subsequently cross-linked to lock in the position shown in FIG. 7A as a first memory shape. Next, the cylinder 54 is heated above its transition temperature and deformed at its end section 56 and finally cooled to form a retaining section 58 as shown in FIG. 7B. A disc 60 of any geometric shape is then positioned on shelf 58 to thereby retain the disc or panel 60 thereon. Next, after being subjected to heat above the transition temperature of the deformed cross-linked polymer, end sections 56 will revert back to their original memory shape such that shelves 58 will be removed thereby allowing panel 60 to be released and fall downwardly. A FIG. 7 embodiment of the present invention has many applications. For example, panel 60 may consist of a ceiling tile which is generally used in conjunction with well known hung ceilings. Thus, when a fire in a building heats the ceiling panel supports 54, the ceiling tile 60 will drop out thereby exposing recessed fire extinguishers (not shown) which are mounted behind the panels. Thus, the embodiment shown in FIG. 7 may be used in many fire and smoke prevention applications.

Figure 8A:
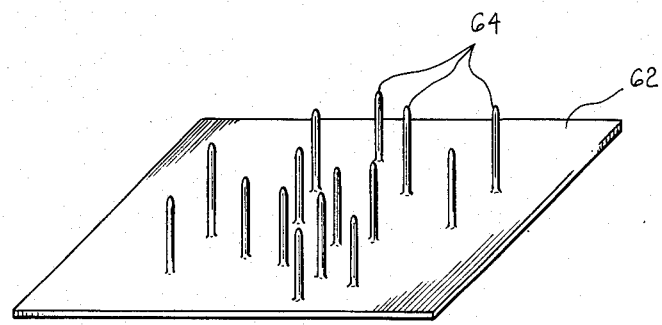
FIGS. 8A-8D are perspective views showing a universal process for holding and releasing objects of complex shape in accordance with the present invention.
Figure 8B:
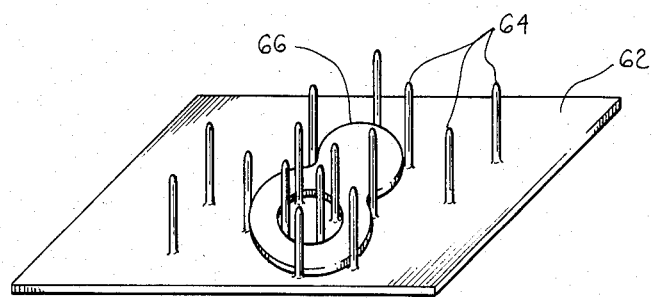
Figure 8C:
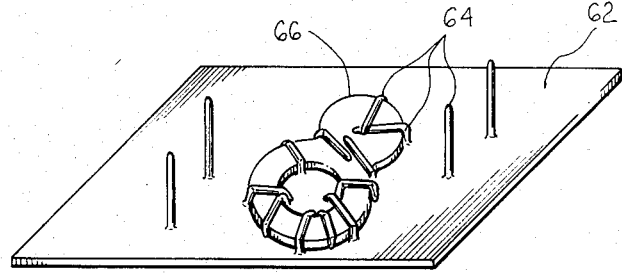
Figure 8D:
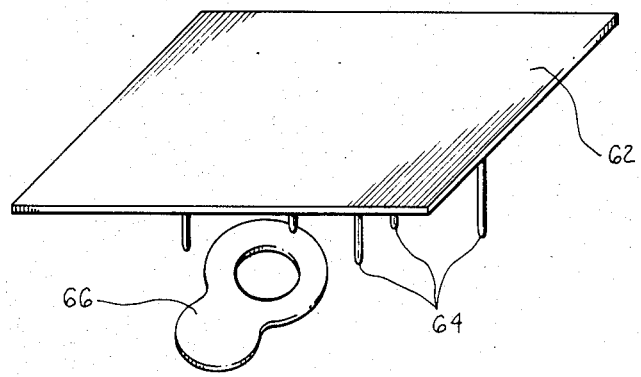

In FIGS. 8A-8D, an embodiment of the present invention which is particularly useful for holding and releasing objects of complex shape is shown. This "universal" holder comprises a planar substrate 62 having a plurality of fingers or protrusions 64 extending therefrom. This particular configuration is comprised of a suitable polymeric material which, upon subjection to irradiation, will be cross-linked and therefore locked into a first memory shape. Next, an object of complex shape, shown for example at 66 in FIG. 8B, is deposited upon the plurality of fingers 64. Fingers 64 are then heated above the transition temperature of the cross-linked polymer, deformed to effect a tight hold on complex object 66 and cooled down to lock fingers 64 into a second deformed shape as shown in FIG. 8C. As with the previous embodiments, at any appropriate time, the deformed fingers 64 which hold complex shaped objects 66 may be reheated above the transition temperature of the polymeric material to effect release of the objects 66 with the deformed finger 64 reverting back to the original memory shape (see FIG. 8D).

It will be appreciated that in the embodiments shown in FIGS. 3-8, it is the deformed cross-linked polymeric part which holds or locks in a second object or part; and thereafter releases that second object or part upon reheating. However, in an alternative method of practicing the present invention, the cross-linked deformed polymeric material may be itself held; the deformed cross-linked material releasing itself from the holder upon reheating. Such alternative embodiments of the present invention are shown in FIGS. 9 and 10. Thus, in FIG. 9A, an L-shaped shelf structure 68 having an opening 70 therethrough and defining an inner diameter D1 and a smaller outer diameter D2 is shown. Next, a cross-linkable polymeric material 72 having a length L which is less than the diameter D2 is formed and then cross-linked to lock in a first memory shape as shown in FIG. 9A. Thereafter, polymeric material 72 is heated and deformed to define a flat disc or plate and thereafter cooled to lock in the deformed second shape (see FIG. 9B). The deformed second shape of cross-linked polymeric material 72 will have a new length L' which is greater than diameter D2 and equal to or less than diameter D1. Thus, as shown in FIG. 9C, flat plate 72 will rest upon the shelf 68 and thereby close the opening identified at 70. Upon a second heating wherein the polymeric material 72 is heated above the transition temperature thereof, the cross-linked deformed polymer will revert back to its original memory shape having a length L (which is less than diameter D2) and thereby fall through opening 70 as indicated by the arrow in FIG. 9D. The embodiment of the present invention as shown in FIG. 9 will function in a manner similar to the embodiment of FIG. 7. Accordingly, the FIG. 9 embodiment is well suited for use as a ceiling tile which is generally used in conjunction with well known hung ceilings. This embodiment is also well suited for any other use wherein it is desired to expose or access an opening when environmental temperature is elevated.

Similarly, in FIGS. 10A-10D, a pipe or other conduit 74 having retaining means 76 (such as a flange) therein for holding or retaining a disc or the like is shown. A cross-linkable polymeric material 78 having a diameter D which is less than the diameter defined by the inside walls of the conduit 74 is formed and then subjected to irradiation or other means to effect cross-linking and define a first memory shape as shown in FIG. 10A. Disc 78 is then heated above its transition temperature, deformed and cooled to form a second deformed shape having a diameter D''; diameter D'' being sufficiently large to permit retaining means 76 to hold disc 78 therein (FIG. 10B). Subsequently, as the temperature is elevated above the transition temperature of the deformed cross-linked polymer, disc 78 will revert back to its original memory shape (FIG. 10C) and thereafter fall from retaining means 76 (FIG. 10D). The embodiment of FIG. 10 is somewhat analogous to the previously discussed FIG. 6 embodiment and is particularly well suited for those applications requiring high temperature i.e. heat triggered, releasing or blowouts. In another application, disc 78 may be used to divide several chambers such as chambers 80 and 82 in FIG. 10B. Thus, the embodiment of FIG. 10 may be used as a seal which permits heat actuated destruction thereof and allows mixing of several components between separated chambers.

Figure 11A:
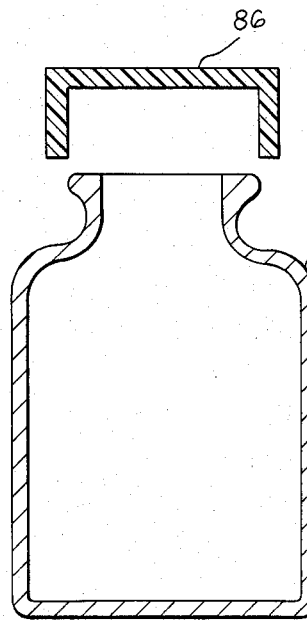
FIGS. 11A-11D are cross-sectional elevation views showing the holding and releasing of a container cap in accordance with the method of the present invention.
Figure 11B:
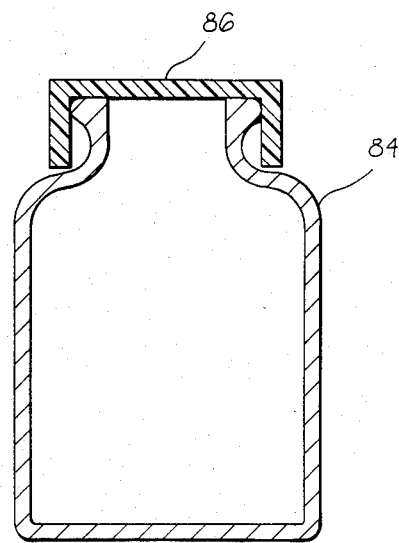
Figure 11C:
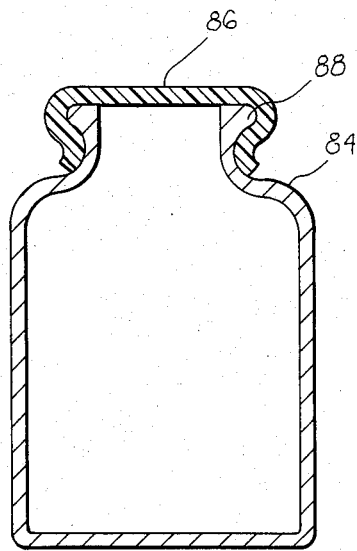
Figure 11D:
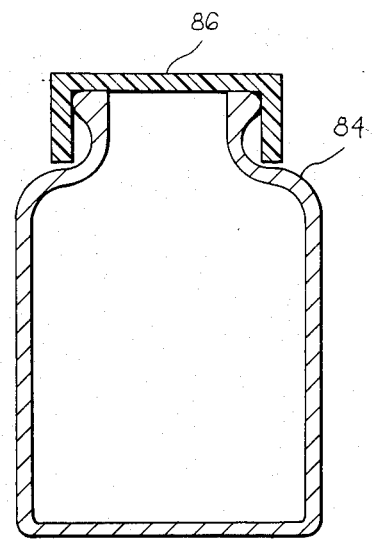
Figure 12A:
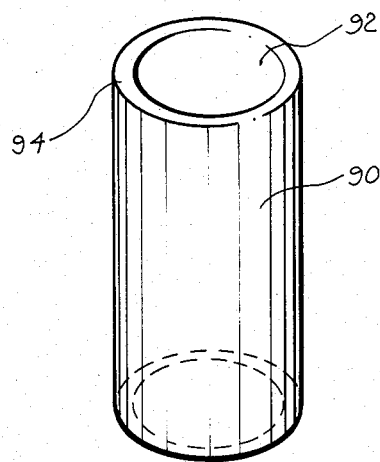
FIGS. 12A-12D are elevation views of a container for fluid in accordance with the present invention.
Figure 12B:
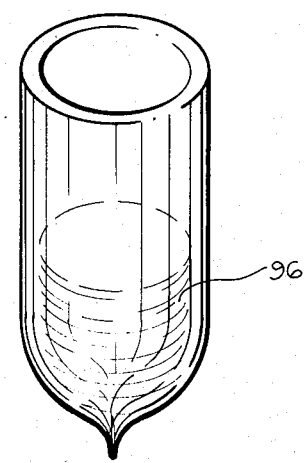
Figure 12C:
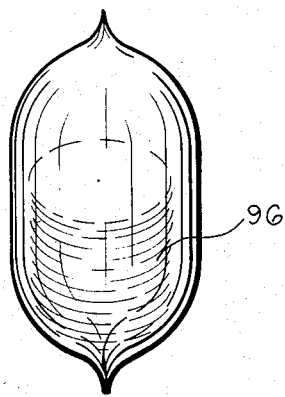
Figure 12D:
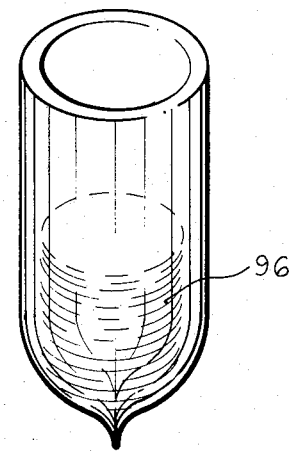

In FIGS. 11A-11D, an embodiment of the present invention is shown which is well suited to act as a cap or lid for closing a container identified at 84. In FIG. 11A, a cap or lid 86 is comprised of a cross-linkable polymeric material and is subjected to suitable cross-linking so as to provide a first memory shape as shown therein. The first memory shape of cap 86 may be defined as an open ended cylinder which loosely fits over the container 84 (FIG. 11B). Cap 86 is then heated, deformed and cooled to correspond to the shape of the neck 88 of container 84 and thereby effect a tight or snug fit thereon. At any desired time thereafter, deformed cap 86 may be subjected to a second heating whereupon the cap will revert back to its original shape and once again be loosely positioned on container 84 (see FIG. 11D). The embodiment of FIG. 11 may find great utility in many different types of container closure applications. One useful application is in providing tamper proof-type protections which may be easily heat releaseable i.e. by hot water.

In FIG. 12, another example of the process of the present invention being utilized in conjunction with the closure of a container is shown. Thus, in FIG. 12A, a cylindrical container 90 having an opening 92 at one end 94 thereof, is shown after being subjected to cross-linking and thereby locking in a first memory shape. Next, a liquid or other fluid is provided within container 90 (FIG. 12B) and the end 94 of container 90 is subjected to heat, deformed and cooled to effect a liquid-tight closure as shown in FIG. 12C. At any desired time thereafter, end 94 of container 90 may be heated a second time whereupon opening 92 will reopen and the liquid 96 therein may be accessed for dispensing.

The temporary holding and releasing process for cross-linked polymers in accordance with the present invention and as discussed by the numerous examples hereinabove is well suited for multiple use applications. It will be appreciated that the holding and releasing of parts or objects may be repeated over numerous cycles. For example, in one test, 50 cycles were successfully completed for (1) heating, (2) deforming to close, (3) cooling so as to lock in the deformation and (4) reheating to open the container such as the one disclosed in FIG. 12 hereinabove. The cross-linked polymeric container was comprised of commercially available low density polyethylene (LDPE); nominal 3/16 inch outer diameter tubing with 0.025 inch wall thickness. Heating was conducted with a lab hot air heat gun set at 420° F., deformation was effected with a pair of pliers and cooling was done with cold water. The operation was manually performed but surprisingly achieved average total cycle times of 0.4–0.8 min/cycle depending primarily upon time of cooling and therefore increased times to reheat.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for a first part to temporarily hold and release a second part comprising the steps of:
   forming a cross-linkable polymeric first part to a first memory shape;
   cross-linking said polymeric first part to lock in said first memory shape;
   heating said first memory shaped polymeric first part to a temperature above its transition temperature;
   deforming said heated memory shaped polymeric first part to a second deformed shape so as to hold onto and surround at least a portion of a second part;
   cooling said deformed second shaped first part to temporarily hold and surround the second part; and
   heating said deformed second shaped first part above its transition temperature wherein said first part will revert from its deformed second shape to its first memory shape and wherein the held and surrounded second part will be released from said first part whereby said first part and said second part will be totally separated and independent from each other.

2. The process of claim 1 including:
   forming said first memory shape as a base having at least one holding means extending therefrom, said holding means having an opening therethrough which is adapted to receive the second part.

3. The process of claim 2 including:
   forming said holding means as a cylindrical shape.

4. The process of claim 1 including:
   forming said first memory shape as a tube having a longitudinal slot therethrough defining an interior and an exterior; and
   deforming said tube to close said slot.

5. The process of claim 1 including:
   forming said first memory shape as a planar sheet having at least one opening therethrough which is adapted to receive the second part.

6. The process of claim 1 including:
   forming said first memory shape as an open flange comprising a base having extensions extending therefrom and defining an opening therebetween which is adapted to receive the second part.

7. The process of claim 6 wherein said extensions define a cylinder.

8. The process of claim 6 wherein:
   said second part is a plate or disc.

9. The process of claim 1 including:
   forming said first memory shape to include a retaining shelf, said retaining shelf adapted to receive the second part.

10. The process of claim 9 wherein:
    said second part is a plate or disc.

11. The process of claim 1 including:
    forming said first memory shape as a substrate having a plurality of protrusions extending therefrom, said protrusion adapted to deform and hold the second part.

12. The process of claim 1 including:
    forming said first memory shape as a lid comprising a base having sidewalls extending therefrom and defining an opening therebetween adapted to be disposed on the second part.

13. The process of claim 12 wherein:
    the second part is a container.

14. The process of claim 1 wherein said cross-linkable polymeric material is a cross-linkable material selected from the group comprising polyethylene, polyethylene co-polymers, polyvinylchloride (PVC), elastomers, blends of PVC and elastomers, ethylenevinylacetate (EVA) or EVA/wax blends.

15. The process of claim 1 wherein:
    said cross-linking is effected by irradiation or chemical additives.

16. A holding and releasing device comprising:
    an object to be held and released;
    means for temporarily holding and releasing said object, said holding means comprising a cross-linked polymeric material formed to a first memory shape;
    wherein said holding means is adapted to be heated above its transition temperature a first time and deformed to a second deformed shape so as to hold onto and surround at least a portion of said object and thereafter cooled to temporarily hold said object;
    wherein said deformed second shaped holding means is adapted to be heated above its transition temperature a second time whereby the holding means will revert from its deformed second shape to its first memory shape and whereby said held object will be released from the holding means; and whereby said holding means and said object will be totally separated and independent from each other.

17. The device of claim 16 wherein said holding means comprises:

a base having at least one protrusion extending therefrom, said protrusion having an opening therethrough which is adapted to receive the object.

18. The device of claim 17 wherein:
said protrusion has a cylindrical shape.

19. The device of claim 16 wherein said holding means comprises:

a tube having a longitudinal slot therethrough defining an interior and an exterior; and
said tube is adapted to deform wherein said slot is closed.

20. The device of claim 16 wherein said holding means comprises:

a planar sheet having at least one opening therethrough which is adapted to receive the object.

21. The device of claim 16 wherein said holding means comprises:

an open flange comprising a base having extensions extending therefrom and defining an opening therebetween which is adapted to receive the object.

22. The device of claim 21 wherein said extensions define a cylinder.

23. The device of claim 21 wherein:
said object is a plate or disc.

24. The device of claim 16 wherein said holding means includes:

a retaining shelf, said retaining shelf adapted to receive the object.

25. The device of claim 24 wherein:
said object is a plate or disc.

26. The device of claim 16 wherein said holding means comprises:

a substrate having a plurality of protrusions extending therefrom, said protrusions adapted to deform and hold the object.

27. The device of claim 16 wherein said holding means comprises:

a lid comprising a base having sidewalls extending therefrom and defining an opening therebetween adapted to be disposed on the object.

28. The device of claim 27 wherein:
the object is a container.

29. The device of claim 16 wherein said cross-linked polymeric material is a cross-linked material selected from the group comprising polyethylene, polyethylene co-polymers, polyvinylchloride (PVC), elastomers, blends of PVC and elastomers, ethylenevinylacetate (EVA) or EVA/wax blends.

30. A process for a first part to temporarily hold and release a second part comprising the steps of:

forming a cross-linkable polymeric first part to a first memory shape comprising a base having at least one holding means extending therefrom, said holding means having an opening therethrough which is adapted to receive a second part;

cross-linking said polymeric first part to lock in said first memory shape;

heating said first memory shaped polymeric first part to a temperature above its transition temperature;

deforming said heated memory shaped polymeric first part to a second deformed shape so as to hold on to the second part;

cooling said deformed second shaped first part to temporarily hold the second part; and heating said deformed second shaped first part above its transition temperature wherein said first part will revert from its deformed second shape to its first memory shape and wherein the held second part will be released.

31. The process of claim 30 including:
forming said holding means as a cylindrical shape.

32. A holding and releasing device comprising:
an object to be held and released;

means for temporarily holding and releasing said object, said holding means comprising a cross-linked polymeric material formed to a first memory shape, said first memory shape including a base having at least one protrusion extending therefrom, said protrusion having an opening therethrough which is adapted to receive said object;

wherein said holding means is adapted to be heated above its transition temperature a first time and deformed to a second deformed shape so as to hold onto said object and thereafter cooled to temporarily hold said object; and wherein said deformed second shaped holding means is adapted to be heated above its transition temperature a second time whereby the holding means will revert from its deformed second shape to its first memory shape and whereby said held object will be released.

33. The device of claim 32 wherein:
said protrusion has a cylindrical shape.

* * * * *